United States Patent
Anderson (10) Patent No.: US 7,315,665 B1
(45) Date of Patent: Jan. 1, 2008

(54) LIQUID-CRYSTAL PLANAR-WAVEGUIDE APPARATUS AND METHOD FOR FAST CONTROL OF POLARIZATION AND OTHER PROPERTIES OF LIGHT

(75) Inventor: Michael H. Anderson, Lyons, CO (US)

(73) Assignee: Meadowlark Optics, Inc., Fredrick, CO (US)

( * ) Notice: Subject to any disclaimer, the term of this patent is extended or adjusted under 35 U.S.C. 154(b) by 399 days.

(21) Appl. No.: 11/056,934

(22) Filed: Feb. 10, 2005

Related U.S. Application Data (60) Provisional application No. 60/543,350, filed on Feb. 10, 2004.

(51) Int. Cl.
*G02B 6/00* (2006.01)
*G02F 1/335* (2006.01)

(52) U.S. Cl. .................. 385/11; 385/8; 385/9; 385/31; 385/40; 385/125; 385/27; 385/14; 349/18; 349/193

(58) Field of Classification Search ................ 385/11, 385/31, 40, 129, 130, 131, 123, 125, 126, 385/2, 8, 9, 27, 14; 349/16, 17, 18, 193, 349/194, 201, 202
See application file for complete search history.

(56) References Cited

U.S. PATENT DOCUMENTS

| | | | |
|---|---|---|---|
| 3,963,310 A | 6/1976 | Giallorenzi et al. | 385/129 X |
| 4,385,806 A | 5/1983 | Fergason | 350/347 R |
| 4,721,352 A * | 1/1988 | Sorin et al. | 385/11 |
| 4,737,014 A | 4/1988 | Green | 385/14 X |
| 4,767,183 A | 8/1988 | Martin | 385/100 X |
| 4,887,884 A | 12/1989 | Hayden | 385/125 X |
| 4,898,441 A | 2/1990 | Shimizu | 385/14 X |
| 5,005,952 A | 4/1991 | Clark et al. | 350/335 |
| 5,060,307 A | 10/1991 | El-Sherif | 359/173 |
| 5,140,654 A | 8/1992 | Akasaka et al. | 385/8 |
| 5,347,377 A * | 9/1994 | Revelli et al. | 349/193 |
| 5,361,320 A * | 11/1994 | Liu et al. | 385/143 |
| 5,388,169 A * | 2/1995 | Kobayashi et al. | 385/2 |
| 5,486,940 A | 1/1996 | Fergason et al. | 359/74 |
| 5,586,205 A * | 12/1996 | Chen et al. | 385/29 |
| 5,748,825 A | 5/1998 | Rockwell, III | 385/126 |
| 6,043,861 A | 3/2000 | Davis | 349/193 |
| 6,154,591 A | 11/2000 | Kershaw | 385/39 |
| 6,393,186 B1 | 5/2002 | Deacon | 385/50 |
| 6,470,105 B1 * | 10/2002 | Baney et al. | 385/16 |
| 6,603,902 B1 * | 8/2003 | So | 385/37 |
| 2002/0041726 A1 | 4/2002 | Thackara | 385/16 |
| 2002/0071646 A1 | 6/2002 | Eggleton et al. | 350/335 |

* cited by examiner

*Primary Examiner*—Brian M. Healy
(74) *Attorney, Agent, or Firm*—Cochran Freund & Young LLC; James R. Young (57) ABSTRACT

A polarization controller includes a plurality of liquid crystal cells positioned as cladding on a waveguide that propagates a beam of light so that the evanescent field extends into the liquid crystal cells, and a ½-wave birefringent retarder for rotating the eigenstates of polarization between the liquid crystal cells. For fast response, the evanescent field preferably extends only into the surface effect region of the liquid crystal cells, where directors in the liquid crystal respond faster to changes in voltages applied across the liquid crystal cells.

41 Claims, 6 Drawing Sheets

LIQUID-CRYSTAL PLANAR-WAVEGUIDE APPARATUS AND METHOD FOR FAST CONTROL OF POLARIZATION AND OTHER PROPERTIES OF LIGHT

CROSS-REFERENCE TO RELATED APPLICATIONS

The present patent application claims the benefit of Provisional Patent Application Ser. No. 60/543,350, which was filed on Feb. 10, 2004, in the United States Patent and Trademark Office.

BACKGROUND OF THE INVENTION

1. Field of the Invention

This invention is related generally to liquid crystal devices for controlling properties of light, and, more particularly, to use of fast response of liquid crystal molecules near boundary surfaces in combination with long interaction lengths of planar waveguide structures for fast control of polarization.

2. State of the Prior Art

It is often necessary for light beams, such as those used to transmit data, generate control signals, and many other applications to be polarized in a particular manner or in a particular state of polarization in a waveguide for purposes of routing, multiplexing, demultiplexing, signal processing, and other purposes. However, such desired polarization as well as phase relationships and other properties can become attenuated or degraded as the light propagates through various media or devices, or the polarization and/or phase may have to be changed or adjusted to correlate or combine with another beam of a different polarization state. Even after a particular desired polarization state is set, temperature changes, mechanical pressure or tension on optical fibers or other optic components, and many other variables can cause the polarization state of light to undergo changes.

Polarization controllers are used to set, recondition, or readjust polarization of light beams for these and other purposes. Practical considerations require that polarization controllers for such purposes be electrically controllable, and it is desirable that they respond fast to electric control signals. Liquid crystal materials have the largest electro-optic response of all currently known materials, and they are relatively easy to incorporate into optical devices. Therefore, they are used in many polarization controllers as well as in controllers of other light properties. However, the primary drawback of such ordinary liquid crystal polarization control devices is that their response times to changing electric fields, typically measured in tens of milliseconds, is slower than that required for many polarization controller applications.

Another class of crystalline materials, lithium niobate ($LiNbO_3$), is much faster, with response times that can modulate light in gigahertz frequencies, and they can be used in applications that require faster response times than ordinary liquid crystals. However, $LiNbO_3$ is also very expensive to incorporate into devices, because it does not lend itself to high-volume manufacturing processes and requires tedious polishing. Further, while the tens of milliseconds speed of ordinary liquid crystal devices is too slow for many applications, the super-fast, gigahertz modulating frequency capabilities of $LiNbO_3$ are impressive, but unnecessary and do not justify the expense for many applications. Therefore, there is a need for light control devices, such as polarization controllers, that respond to electric control signals significantly faster than ordinary liquid crystal devices, but which are less expensive and easier to manufacture than the super-fast $LiNbO_3$ devices.

Additional objects, advantages, and novel features of the invention are set forth in part in the description that follows and others will become apparent to those skilled in the art upon examination of the following description and figures or may be learned by practicing the invention.

SUMMARY OF THE INVENTION

Accordingly, an object of the present invention is to provide fast-acting devices for controlling light properties, such as polarization, that respond quickly and reliably to electric control signals.

A more specific object of this invention is to provide a method and apparatus for controlling polarization of light that has significantly faster electro-optic response than ordinary liquid crystal polarization control devices, yet is easier to manufacture and less expensive than lithium niobate devices.

Additional objects, advantages, and novel features of this invention are set forth in the description and examples below, and others will become apparent to persons skilled in the art upon examination of the following specification or may be learned by practicing the invention. The objects and advantages of the invention may be realized and attained by the instrumentalities, combinations, compositions, or methods particularly included in the appended statements.

To achieve the foregoing and other objects and in accordance with the purposes of this invention, as embodied and described herein, a method of this invention may comprise using at least two, but preferably three or more, liquid crystal cells as variable birefringence cladding on a waveguide to control polarization of a beam propagating through the waveguide. The liquid crystal cells are prepared with directors oriented parallel to the propagation vector of light through the waveguide so that application of voltages across the individual liquid crystal cells varies retardance of extraordinary rays in the TM mode to alter polarization of light in the evanescent field of the light beam, which extends from the core of the waveguide into the cladding. Between liquid crystal cells, the eigenstates of polarization are rotated, preferably 45 degrees or multiples of 45 degrees, and each liquid crystal cell is preferably long enough to provide at least one wave of stroke, so that two liquid crystal cells can provide practical polarization control for many applications, but three or more liquid crystal cells in this configuration can change any polarization state to any other polarization state, i.e., can connect any point on the Poincare sphere to any other point on the Poincare sphere. Of course, other degrees of eigenstate rotation between other numbers of liquid crystal cells could be used to accomplish polarization control, once the principles of this invention are understood. Also, other numbers of liquid crystal cells, each of which has more or less than one wave of stroke could also be used. For example, but not for limitation, two liquid crystal cells, each having a half wave of stroke could be substituted for one liquid crystal cell with one wave of stroke. Other combinations can also be devised once the principles of the invention are understood. For fast polarization control, it is preferable that the evanescent field of the beam extend only into the surface effect region of the liquid crystal cells, where directors respond much faster to applied voltages and variations in applied voltages than other regions of the liquid crystal cells.

BRIEF DESCRIPTION OF THE DRAWINGS

The accompanying drawings, which are incorporated herein and form a part of the specification, illustrate preferred embodiments of this invention, and, together with the description, serve to explain the principles of the invention. In the drawings.

DETAILED DESCRIPTION OF THE PREFERRED EMBODIMENTS

Figure 1:
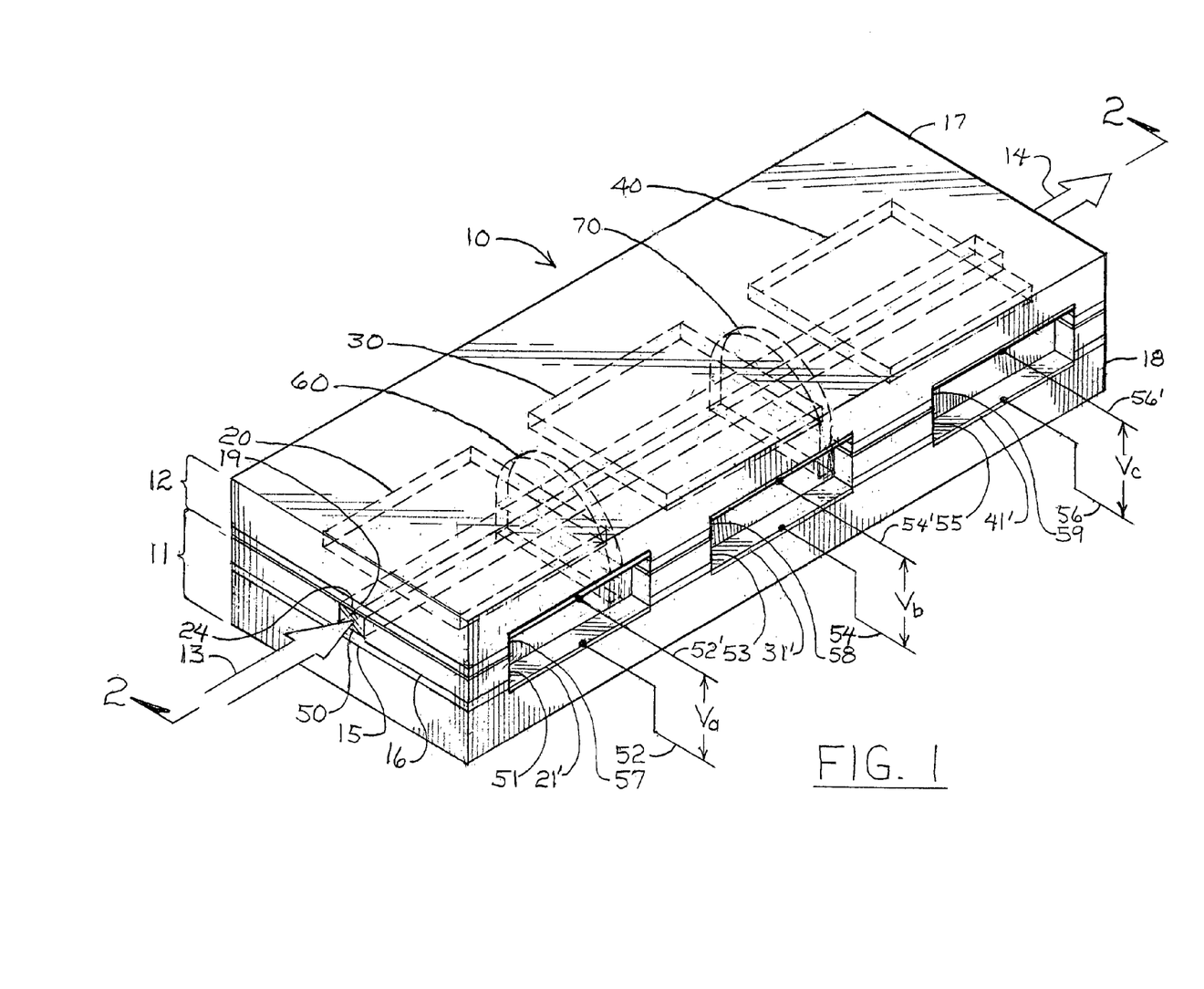
FIG. 1 is an isometric view of a liquid-crystal planar-waveguide device for polarization control of a beam of light according to this invention.

An example fast polarization controller 10 according to this invention is shown in FIG. 1 in a single channel (i.e., single wavelength) embodiment for purposes of describing the principal features and operation of the invention. However, this fast polarization controller invention, which can operate as much as ten times or more faster than conventional liquid crystal polarizers, is also useable in multi-channel (i.e., multiple wavelength) embodiments, as will be described in more detail below.

Figure 2:
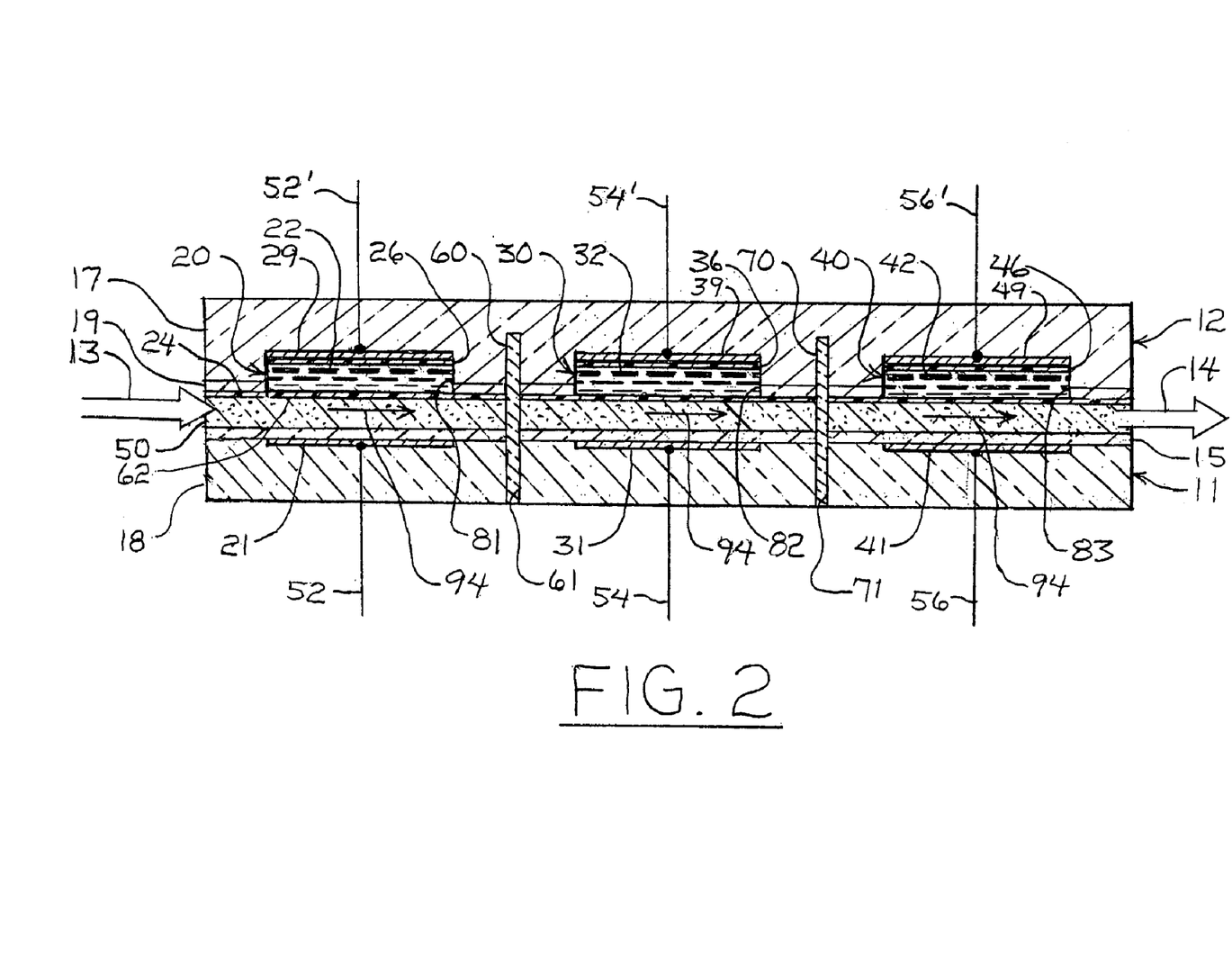
FIG. 2 is a longitudinal cross-section view of the liquid-crystal, planar-waveguide, polarization controller device of this invention, taken along section line 2-2 in FIG. 1.
Figure 3:
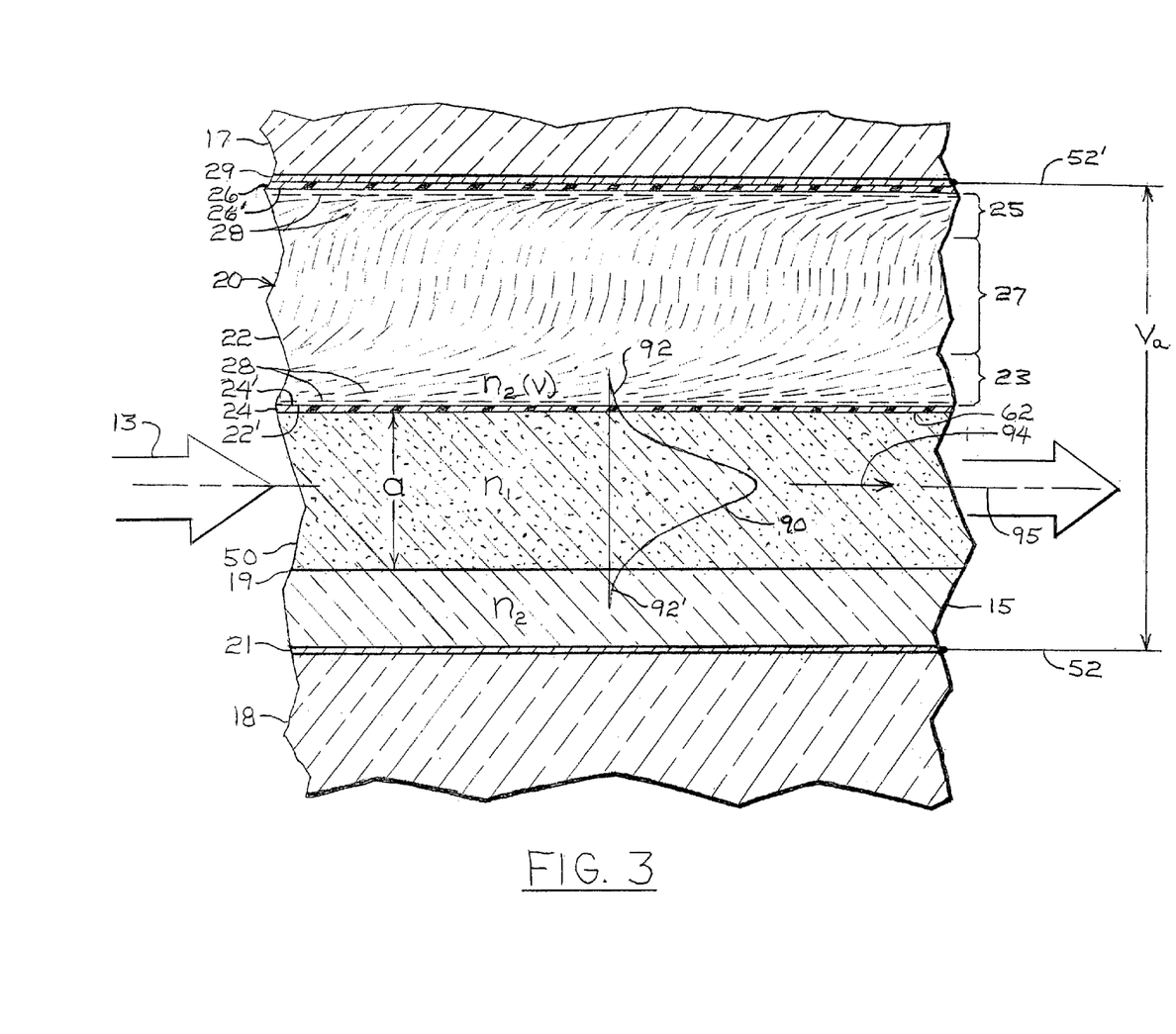
FIG. 3 is an enlarged cross-sectional view of a representative one of the liquid crystal cells and adjacent waveguide from FIG. 2.

Referring now to the isometric view of the example fast polarization controller 10 in FIG. 1 in conjunction with the cross-sectional views in FIGS. 2 and 3, an input light beam 13 of any polarization condition can have its polarization controlled or tuned to emerge as an output beam 14 in any desired polarization state (e.g., horizontal linear, vertical linear, right-hand circular, left-hand circular, right-hand circular or elliptical) in any orientation (azimuth) by varying the magnitudes of the respective voltages $V_a$, $V_b$, $V_c$ across the three birefringent liquid crystal cells 20, 30, 40. The light beam 13 propagates through the fast polarization controller 10 via the waveguide core 50, and the liquid crystal cells 20, 30, 40 are positioned sequentially adjacent the waveguide core 50 in such a manner that the evanescent field of the light beam 13 in the waveguide 50 extends into the liquid crystal cells 20, 30, 40, as will be explained in more detail below. The eigenstates of polarization of the light beam 13 are rotated between the first and second liquid crystal cells 20, 30 and between the second and third liquid crystal cells 30, 40 by any convenient technique. For example, a first ½-waveplate 60 is positioned across the waveguide 50 between the first liquid crystal cell 20 and the second liquid crystal cell 30, and a second ½-waveplate 70 is positioned between the second liquid crystal cell 30 and a third liquid crystal cell 40 in order to effectively rotate the polarization eigenstates of the light beam 13 between liquid crystal cells 30, 40, respectively. Polarization eigenstates are the directional distributions of the electric field components $E_x$ and $E_y$ (see FIG. 4), and they are rotated after liquid crystal cells 20, 30 in order to expose different directional distributions of the electric field components $E_x$ and $E_y$ to the successive retardation effects of the next following liquid crystal cells 30, 40, respectively, as will be discussed in more detail below.

Birefringent waveplates and other devices for controlling phase and polarization of light, including rotating planes or directions of polarization, are well-known to persons skilled in the art, thus do not have to be described in detail here for an understanding of this invention. Suffice it to say, in general, that birefringent materials have the characteristic of propagating light at different speeds in different directions, such that: (i) two sets of Huygens wavelets propagate from every wave surface in such a material, one spherical and the other ellipsoidal; (ii) the spherical and ellipsoidal wavelets are tangent to each other in a direction called the optic axis; (iii) the ray which corresponds to the wave surfaces tangent to the spherical wavelets is called the ordinary ray and the ray corresponding to the wave surfaces tangent to the ellipsoid wavelets is called the extraordinary ray; (iv) the velocity of the ellipsoidal waves is either greater or lesser than that of the spherical waves, depending on the birefringent material, except in the direction of the optic axis, where the two are equal; (v) a plate of such birefringent material retards an extraordinary ray in relation to an ordinary ray or vice versa, depending on the birefringent material, except in the direction of the optic axis; (vi) such a birefringent plate of a thickness which retards one of the rays with respect to the other by one-fourth of a wavelength is called a quarter-waveplate or λ/4 waveplate; and (vii) such a birefringent material of a thickness which retards one of the rays with respect to the other by one-half a wavelength is called a half-waveplate or λ/2 waveplate. A λ/2 waveplate has the effect of rotating a plane of polarization of a beam by two times the amount by which its optic axis is rotated in relation the incident plane of polarization. Therefore, the λ/2 waveplates 60, 70 are effective to rotate eigenstates of polarization $E_x$ and $E_y$ by any desired amount between the liquid crystal cells 20, 30 and 30, 40, respectively.

It should be mentioned for clarity that the optic axis as defined above is distinct from the optical axis, which corresponds to the longitudinal axis 95 (FIG. 3) of the waveguide core 50, i.e., the propagation vector 94 of the guided light beam 13 through the core 50. Therefore, to avoid unnecessary confusion, the optical axis will not be mentioned again. Instead, the direction of propagation of the guided light beam 13 will be indicated and discussed by reference to the longitudinal axis 95 of the waveguide core 50 and/or the propagation vector 94 of the light beam 13 in the waveguide.

It is also well-known that three liquid crystal, tunable waveplates, each having one wave of stroke and having their respective optic axes oriented at 45 degrees to each other, will provide a full range of polarization control, i.e., be able to transform any incident state of polarization to any other state of polarization. See, for example, U.S. Pat. No. 5,005,952, issued to M. Clark et al. Only two of such liquid crystal, tunable waveplates are needed to get from any polarization state to linear polarization, but a third such liquid crystal, tunable waveplate is needed to then transform such linear polarization to any other polarization state, i.e., to move the polarization state off the equator of the Poincare sphere. Stroke is understood by persons skilled in the art to mean the phase difference, i.e., retardation, that can be achieved between one AC modulated voltage magnitude and another AC modulated voltage magnitude across a liquid crystal cell expressed in units of wavelength. For example, if a liquid crystal cell is effective to retard phase by one wavelength when a voltage across the cell is switched from a minimum voltage (for example, zero), to some maximum voltage, then the liquid crystal cell is said to have one wave of stroke.

In the preferred embodiment 10 of this invention shown in FIG. 1, however, where the light beam 13 is propagated in a direction parallel to the alignment layers 24, 26 of the liquid crystal cells 20, 30, 40, it is impractical, if not impossible, to orient the respective optic axes of different liquid crystal retarder cells 20, 30, 40 at different angles in relation to each other. Therefore, this invention departs from the convention of having three liquid crystal waveplates oriented with their respective optic axes rotated in relation to each other and propagating light through such three liquid crystal waveplates perpendicular to the alignment layers, as taught by U.S. Pat. No. 5,005,952 issued to Clark et al. Instead, substantially the same optical effect is provided in the preferred embodiment polarization controller 10 of this invention by having the respective optic axes of the liquid crystal retarder cells 20, 30, 40 all oriented in the same direction (e.g., parallel to the longitudinal axis 95 of the waveguide 50) and using the λ/2 waveplates 60, 70 or any other polarization rotation technique to rotate eigenstates of polarization of light in the waveguide 50 as it propagates between the liquid crystal retarder cells 20, 30, 40, as will be explained in more detail below.

Essentially, the state of polarization of a lightwave signal, such as beam 13, describes the magnitude and phase relationships of the electric field (E-field) component inside the signal. The electric fields (E-fields) of any light ray in the signal can be resolved into two arbitrary, orthogonal components $E_x$ and $E_y$, as illustrated in the X-Y coordinate system of FIG. 4. The vector components $E_x$ and $E_y$ are time dependent, so a more proper notation would be $E_x(t)$ and $E_y(t)$. However, it is common for persons skilled in this art to just assume such time dependency and simplify the notation form to merely $E_x$ and $E_y$. This convention will be used in this description.

Figure 4:
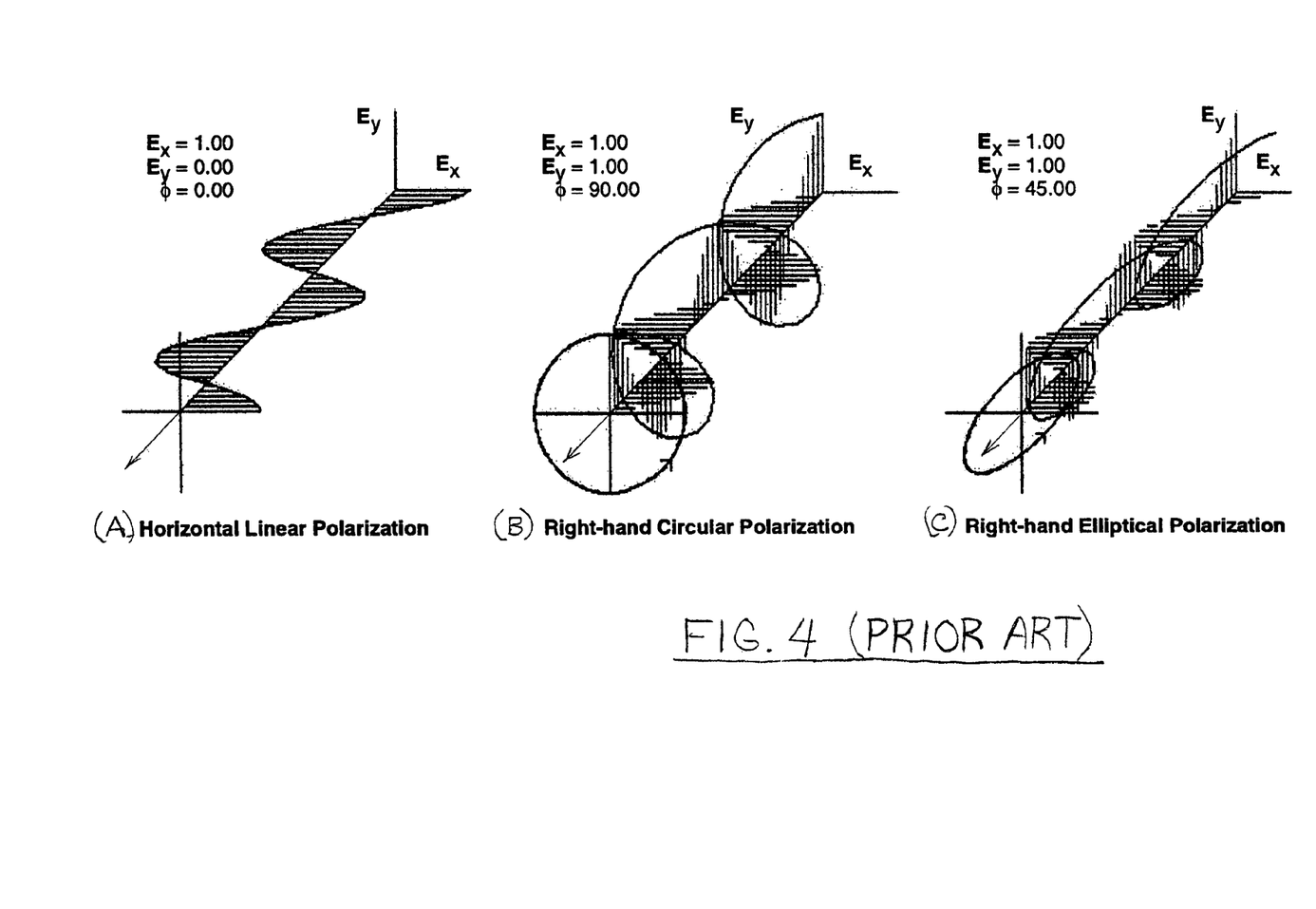
FIG. 4 is a diagrammatic representation of three of the well-known states of polarization used here to illustrate some principles as an aid to explaining uses of the invention.

All polarization states can be shown as unique elliptical displays with various degrees of ellipticity, such as the classic examples of horizontal polarization (0 degrees of ellipticity), right-hand circular polarization (45 degrees of ellipticity), and right-hand elliptical polarization, shown in FIG. 4. Other classic polarization states, such as, vertical linear polarization (90 degrees of ellipticity), left-hand circular polarization, left-hand elliptical polarization, as well as all states in-between those classic states mentioned above, are not shown in FIG. 4 to avoid unnecessary complexity, but they are well-known to persons skilled in the art and can be handled or produced by the fast polarization controller 10 of this invention. Any particular state of polarization is determined by the relative magnitude and phase of the E-vector components ($E_x$ and $E_y$) of the light. Therefore, as is also well known to persons skilled in the art, any desired state of polarization can be created by adjusting the magnitude and phase relationships of the $E_x$ and $E_y$ components of a lightwave signal. Such adjustment can be accomplished in a relatively fast manner with this invention, as explained below.

Figure 5:
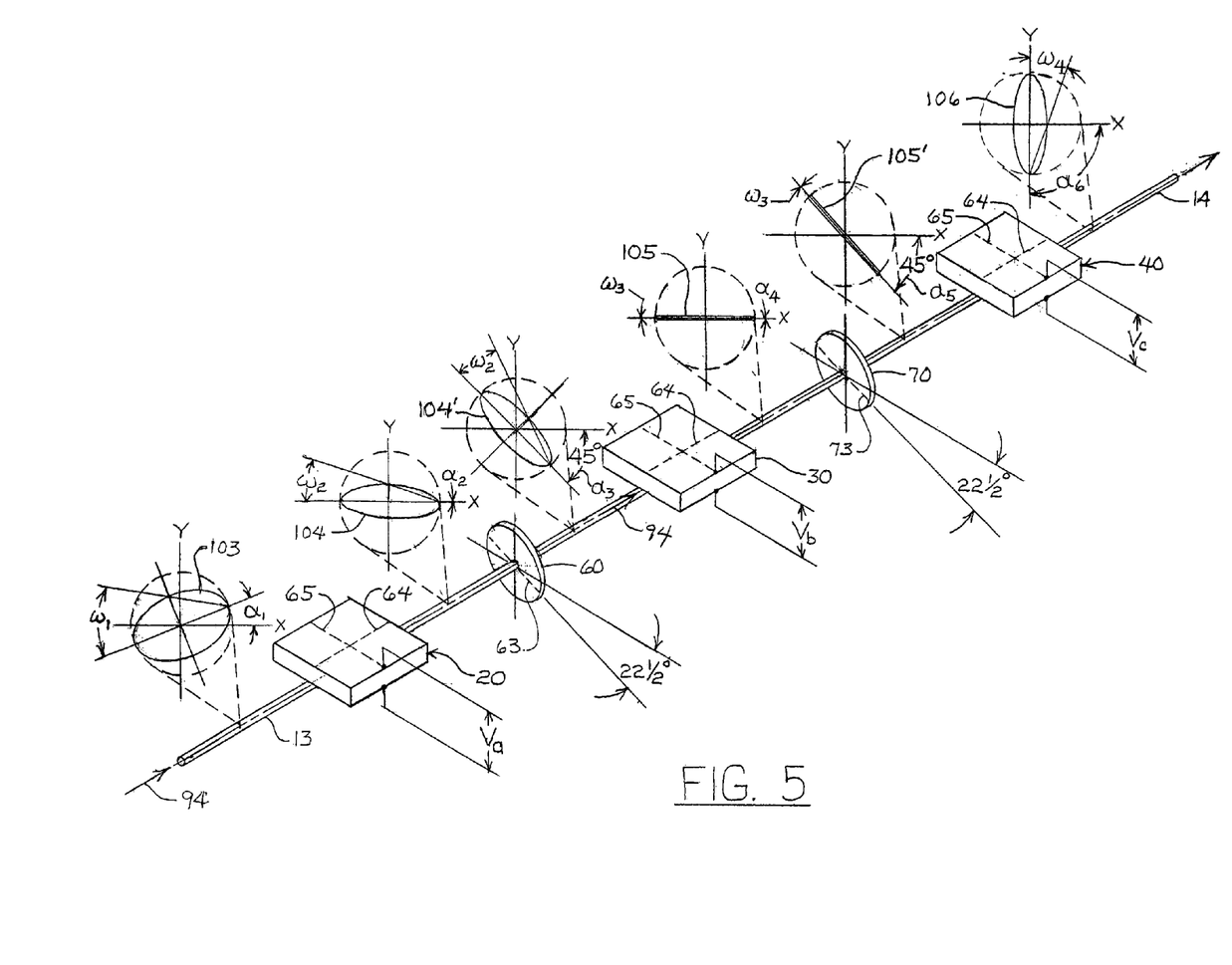
FIG. 5 is a diagrammatic illustration of an example polarization modification with example components of this invention.

The waveguide comprising the core 50, cladding 15, 17, 19, and the liquid crystal cells 20, 30, 40 functioning as cladding with variable indices of refraction, has guided orthogonal transverse magnetic (TM) and transverse electric (TE) modes of light propagation. The alignment surfaces 24' of the liquid crystal cells 20, 30, 40 are preferably prepared in any manner known to persons skilled in the art (e.g., buffing and other methods or material compositions and structures) so that the liquid crystal directors 28 align parallel to the beam propagation vector 94, as illustrated diagrammatically in FIG. 3. Therefore, the optic (slow) axis 64 (see FIG. 5) of the liquid crystal cell 20 is parallel to the propagation vector 94. Consequently, applying modulated voltages $V_a$, $V_b$, $V_c$ of various magnitudes across the liquid crystal cells 20, 30, 40 causes the directors to tilt upwardly in various amounts from the alignment surface 24 in a plane that is parallel to the propagation direction 94 of the light beam 13 in the waveguide 50. Typically, the voltage is applied in a modulated AC (alternating current) square wave format, for example at 2 KHz, and the voltage $V_a$ (or $V_b$ or $V_c$) is the magnitude of the modulated voltage. Such upward tilting of the directors 28 resulting from the application of such voltage changes the effective index of refraction $N_{eff}$ for the TM mode of light, which, in effect, varies the birefringence of the liquid crystal cells 20, 30, 40 to cause varying degrees of birefringent phase retardance of $E_x$ vector components in relation to $E_y$ vector components of the light. As mentioned above, the TM mode is perpendicular to the waveguide interface 62 between the core 50 and the respective liquid crystal cells 20, 30, 40, so the TM mode is also perpendicular to the alignment layer 24. Referring more specifically to FIG. 3, for example, essentially an increase in the applied voltage $V_a$ causes the liquid crystal material 22 to become more birefringent by lowering the effective index of refraction for the TM mode of light propagation and thereby retarding the phase of the TM mode to create an optical path difference (OPD) between the TM and TE modes, which changes the polarization of the light beam 13. Expressed in a different way, the optical phase delay in the TM mode changes the distribution of the E-field components (i.e., magnitude and phase relationships of the $E_x$ and $E_y$ vector components) of the light beam 13, which adjusts the polarization ellipticity between the various states described above, some of which are illustrated for example in FIG. 4 and others of which are well-known to persons skilled in the art. The degree or extent of changes in the E-field components, i.e., the changes of relative magnitudes and/or phase relationship between the $E_x$ and $E_y$ components, will depend on the change of magnitude of the modulated voltage $V_a$. In the example illustrated in FIG. 5, such optical action of the first liquid crystal cell 20 is shown to change an arbitrary elliptical polarization state 103 having any azimuth α, and any elliptical angle ω, to another polarization state 104 in which the azimuth $α_2$ is zero degrees and the elliptical angle $ω_2$ is smaller than $ω_1$. The azimuth α in this diagrammatic illustration in FIG. 5 represents the tilt of the major elliptical axis in relation to a plane that includes the fast axis 65 and slow axis 64 of the cell 20. Therefore, in an X-Y coordinate system, in which the X-axis is in said plane and the Y-axis is perpendicular to said plane, the azimuth α is the angle between the X-axis and the major elliptical axis of the polarization state of the beam 13. The elliptical angle ω is the angle between the major elliptical axis and a straight line that extends through two points where the ellipse intersects its major and minor axes, as shown in FIG. 5.

Then, as illustrated diagrammatically in FIG. 5, the first ½-wave plate 60, which is positioned between the first liquid crystal cell 20 and the second crystal cell 30 (see FIGS. 1, 2, and 5) with its fast axis 63 oriented at 22½ degrees in relation to the fast axis 65 of the liquid crystal cell 20, essentially rotates the eigenstates of polarization (i.e., the $E_x$ and $E_y$ components) by 45 degrees before the beam 13 enters the second liquid crystal cell 30. Therefore, as illustrated in FIG. 5, the polarization state 104' (i.e., elliptical angle $ω_2$) of the light beam 13 emerging from the first ½-wave plate 60 is the same as the polarization state 104

(i.e., elliptical angle $\omega_2$) before the first ½-wave plate 60, but its elliptical axes are rotated 45 degrees. Therefore, the azimuth $\alpha_3$ in this example is 45 degrees.

The polarized beam 13 then encounters the second liquid crystal cell 30, which has its slow axis 64 and fast axis 65 oriented the same as the first liquid crystal cell 20. An applied modulated voltage $V_b$ across the second cell 20, like the voltage $V_a$ applied across the first cell 20, changes the effective index of refraction for the TM mode, thus changes the magnitude and phase relationships of the $E_x$ and $E_y$ vector components to change the state of polarization of the beam 13 to some other state 105 with a different elliptical angle $\omega_3$, as illustrated in FIG. 5. The elliptical angle $\omega_3$ in this arbitrary example is illustrated as being zero, which means that the state of polarization is "linear," and the azimuth $\alpha_4$ of zero degrees means it is "horizontal" linear polarization.

The second ½-wave plate 70, with its fast axis 73 rotated 22½ degrees in relation to the fast axis 65 of the second cell 30, then rotates the eigenstates of polarization by 45 degrees before the beam 13 encounters the third liquid crystal cell 40. Therefore, the polarization state 105' of the beam 13 after the second ½-wave plate 70 is substantially the same ellipticity $\omega_3$ as the polarization state 105 before the second ½-wave plate 70, but the elliptical axis is rotated by 45 degrees. Then a modulated voltage $V_c$ applied to the third liquid crystal cell 40, with its slow axis 64 and fast axis 65 oriented the same as the slow and fast axes 64, 65 of the preceding cells 20, 30, can change the polarization of beam 13 to a desired polarization state 106, as illustrated by the different ellipticity $\omega_4$ of the outgoing beam 14. The major axis of ellipticity of the example desired polarization state 106 is vertical, so the azimuth $\alpha_6$ is 90 degrees.

Consequently, as can be understood from the explanation above, the ½-wave plates 60, 70 enable the three liquid crystal cells 20, 30, 40, with their slow axes aligned in the same direction, i.e., parallel to the beam propagation vector 94, and each having at least one wave of stroke, to change any state of polarization to any other state of polarization, i.e., to connect any point on the Poincare sphere to any other point on the Poincare sphere, even though the respective slow axes 64 and fast axes 65 are oriented the same in all the cells 20, 30, 40. This function of rotating the eigenstates of polarization between the liquid crystal cells 20, 30 and between the liquid crystal cells could also be accomplished by any other means known to persons skilled in the art, for example, by twisting a polarization maintaining fiber or rotating the core of a waveguide, e.g., a circular core to an elliptical core. Also, rotating the eigenstates of polarization by 135 degrees or 270 degrees between the liquid crystal cells 20, 30 and 30, 40 will provide much the same enabling effect as the 45 degrees rotation described in the example above, so, to avoid unnecessary repetition, such rotation by those and other multiples of 45 degrees that provide the same benefit or function are considered to be included in any mention herein of rotating the eigenstates by 45 degrees between said liquid crystal cells.

Two of the cells, e.g., cells 20, 30 with the first ½-wave plate 60 between them or cells 30, 40 with the second ½-wave plate 70 between them, can be used to convert any polarization with an elliptical angle $\omega$ greater than zero, or with an elliptical angle $\omega$ of zero and an azimuth $\alpha$ greater than zero, to any other state of polarization, which may be sufficient for many applications. However, if the incoming beam 13 is linearly polarized and oriented horizontally, i.e., parallel to the plane than includes both the slow and fast axes 64, 65 of a liquid crystal cell, for example, cell 20, then that liquid crystal cell will be ineffective to change the linear polarization. Since the liquid crystal cells 20, 30, 40 only retard phase in the TM mode, as explained above, they have no effect on horizontal, linearly polarized light. Therefore, rotating the eigenstates of such polarization by 45 degrees with the ½-wave plate 60 or 70 or by any other means enables the next liquid crystal cell 30 or 40 to act on and alter the ellipticity, i.e., polarization state. Rotation of the eigenstates by more or less than 45 degrees (any amount greater than zero degrees) will also work for this invention, but 45 degrees is preferred.

Consequently, as mentioned above, the two ½-wave plates 60, 70 between the liquid crystal cells 20, 30, 40, as described above, enable the three cells 20, 30, 40, each having their respective slow and fast axes 64, 65 oriented the same as each other and each being individually controllable with at least one waive of stroke, to change any state of polarization of the input beam 13 to any other desired state of polarization in the output beam 14. Therefore, this combination of elements is very conducive to structuring the fast polarization controller 10 on a common substrate, as illustrated in FIGS. 1-3, although it can also be used with any other convenient structure as well.

A significant feature of this invention, as will be described in more detail below, is that only liquid crystal directors 28 in regions 23 near alignment surfaces 24' (see FIG. 3) of the liquid crystal cells 20, 30, 40 (FIGS. 1 and 2), which react much faster to voltage changes than middle region 27 liquid crystal directors (FIG. 3), are used to vary and control polarization by acting on only the evanescent portion 92 of the light beam 13. Once these and other principles of this invention are understood, persons skilled in the art will be able to devise myriad ways to construct polarizer controllers with a waveguide core, at least two, and preferably three, liquid crystal cells positioned adjacent the core to function as waveguide cladding, and with the evanescent field of the light beam extending into the surface effect region of the liquid crystal cells. The polarization controller 10 shown in FIGS. 1-3 illustrates one such embodiment for example, but not for limitation. The enlarged cross-section of FIG. 3 shows the structure of the polarization controller 10 in the region of the first liquid crystal retarder cell 20, but it is representative of the regions of the second and third liquid crystal cells 30, 40 as well. Therefore, referring now primarily to FIGS. 2 and 3 in combination with FIG. 1, the polarization controller embodiment 10 has a bottom module 11, which comprises the waveguide 50, and a top module 12, which, in this example, comprises the liquid crystal retarder cells 20, 30, 40. When the top module 12 is affixed to the bottom module 11, the liquid crystal cells 20, 30, 40 overlay the waveguide 50 and function as part of the cladding, but each with a variable and controllable index of refraction $n_2(V)$ that varies as a function of voltage $V_a$, $V_b$, $V_c$ across the respective liquid crystal cells 20, 30, 40 as will be explained in more detail below. The variable index of refraction $n_2(V)$ is for the TM mode only, when the alignment surface 24' is prepared so that the directors 28 are parallel to the propagation vector 94 of the light beam 13, as explained above.

In the fast polarization controller embodiment 10 in FIGS. 1-3, the waveguide core 50 is a transparent, preferably thin film, material, such as doped glass, polymer, or other material that is substantially transparent to the light beam 13 with a core index of refraction $n_1$. The first or bottom electrodes or contacts 21, 31, 41 for each liquid crystal cell 20, 30, 40, respectively, is deposited on the substrate 18, followed by a bottom cladding layer 15. The bottom cladding layer 15 has an index of refraction $n_2$, which is less than the index of refraction $n_1$ of the core 50 to confine propagation of light 13 in the waveguide core 50, as is well-known to persons skilled in the art. The core material 50 can be deposited on the bottom cladding layer 15, for example, in a broad layer (not shown) of the desired core thickness, which can then be masked and etched away to leave the core 50 of a desired width and thickness, as illustrated diagrammatically in FIG. 1, or by any other deposition technique known to persons skilled in that art that works for creating the waveguide core 50. Additional side cladding material 16 can be deposited on the bottom cladding layer 15, as best seen in FIG. 1, to clad both lateral sides of the waveguide core 50. The side cladding 16 can be the same material as the bottom cladding 15 with the same index of refraction $n_2$ or some other material with an index of refraction that is less than the index of refraction $n_1$ of the core 50 in order to guide light propagation in the core 50. The top surfaces of the core 50 and side cladding 16 can be polished flat and then a bottom alignment layer 24 for the liquid crystal cells 20, 30, 40 can be deposited over the core 50 and side cladding 16 to complete the bottom module 11 of the fast polarization controller 10. Again, the electric contacts 21, 31, 41, bottom and side cladding 15, 16, and core 50 components of the bottom module 11 can be constructed and fabricated in any manner available to persons skilled in the art and not only in the manner described above. Recessed areas 51, 53, 55 in substrate 18, as shown in FIG. 1, can be provide for access to outcropped portions 21', 31', 41' of electric contacts 21, 31, 41 for connection of electric leads 52, 54, 56, or such electric connections can be made in any other manner known to persons skilled in the art.

The top module 12 of the fast polarization controller 10 comprises cavities 81, 82, 83 (FIG. 2) in a top substrate 17 to contain the liquid crystal material 22, 32, 42 of liquid crystal cells 20, 30, 40, respectively. Before filling the cavities 81, 82, 83 with liquid crystal material, top electric contact layers 29, 39, 49 and top alignment layers 26, 36, 46 of the respective liquid crystal cells 20, 30, 40 are deposited into the cavities 81, 82, 83. The top substrate 17 can serve as top cladding for the waveguide core 50, or a separate top cladding layer 19 can be provided on top substrate 17. In any event, the index of refraction of the top cladding 17 or 19 is less than the index of refraction $n_1$ of the core 50 in order to guide light beam 13 propagation in the core 50 and is preferably, but not necessarily, the same as the index of refraction $n_2$ of the bottom cladding 15. The lateral side of the top substrate 17 can be recessed at 57, 58, 59 (FIG. 1) to expose outcropped portions 29', 39', 49' of the top electrodes 29, 39, 49 for connection of electric leads 52', 54', 56'. Then, when the surfaces of the top alignment layers 26, 36, 46 and the surface of the bottom alignment layer 24, which in this embodiment is illustrated for example to be common to all three liquid crystal cells 20, 30, 40, are buffed in the desired alignment direction, the cavities 81, 82, 83 can be filled with the liquid crystal material 22, 32, 42, respectively, and mounted on the bottom module 11 to form the liquid crystal cells 20, 30, 40 over the waveguide core 50. The top module 12 and the bottom module 11 would be turned upside down during such filling and mounting to prevent spillage of the liquid crystal material 22, 32, 42, and such brushing, filling, and mounting procedures are well-known to persons skilled in the art.

Of course, there are myriad other ways to structure and fabricate the bottom module 11 and/or the top module 12 and to accomplish the assemblage of the liquid crystal cells 20, 30, 40 adjacent the waveguide core 50 that would be well within the capabilities of persons skilled in the art, and this invention is not limited to the specific structures or assemblage described above. Suffice it to say that, once assembled, each liquid crystal cell has an index of refraction $n_2(V)$ for the TM mode that varies as a function of voltage $V_a$, $V_b$, $V_c$ across the liquid crystal material 22, 32, 42 in the respective cells 20, 30, 40, but which is less than the index of refraction $n_1$ of the waveguide core 50, so that each liquid crystal cell 20, 30, 40 functions as a part of the waveguide cladding to confine propagation of light to the waveguide. Of course, as such voltage is increased, the index of refraction $n_2(V)$ increases to modify the phase and/or magnitude relationships between the $E_x$ and $E_y$ components, as explained above, so lightwave guiding decreases. However, it is preferred that the index of refraction $n_2(V)$ should not increase enough to equal or exceed the index of refraction 17 of the core 50 so that the waveguide always has at least some lightwave guidance, unless it is desired to couple light out of the waveguide.

Referring now primarily to the enlarged cross-section view of the first liquid crystal cell in FIG. 3, essentially, it is known that liquid crystal molecules 28 in the edge regions, i.e., surface effect regions, 23, 25 close to the alignment surfaces 24', 26' experience stronger restoration forces than the molecules in the midportion 27 of the liquid crystal cell 20. See U.S. Pat. No. 4,385,806 to Ferguson. Therefore, those liquid crystal molecules 28 in the edge regions 23, 25 respond much faster to changes in voltage $V_a$ than the liquid crystal molecules in the middle region 27, and switching times of 10 to 100 microseconds are possible. One way of interacting with the surface molecules is to apply a high bias voltage $V_a$, for example, about 10 $V_{rms}$, at a frequency much higher than a frequency at which even the surface or edge region 23, 25 molecules can respond and then modulating the molecules 28, thus modulating index of refraction $n_2(V)$ in the edge regions 23, 25, by modulating the applied bias voltage $V_a$.

It is also known that liquid crystal materials can be placed adjacent a guided wave in a planar waveguide to modulate light propagating in the optical path without coupling the light out of the waveguide, as long as the index of refraction $n_2(V)$ of the liquid crystal does not rise to equal or exceed the index of refraction $n_1$ of the core 50, as mentioned above. See also U.S. Pat. No. 5,347,377 to Revelli. The fast polarization controller 10 of this invention utilizes those teachings of Revelli, i.e., modulation of a guided wave with a liquid crystal positioned adjacent a waveguide, and of U.S. Pat. No. 5,486,940 to Ferguson et al., i.e., fast response of liquid crystal molecules 28 in the edge region 23 (also called surface effect region 23), to make a fast polarization controller 10. Another significant feature of this invention, however, is that the waveguide core 50 and liquid crystal cells 20, 30, 40 are designed to limit the penetration of light energy 92 (FIG. 3), i.e., the evanescent field 92, into the liquid crystal cladding material 22 to the surface effect or edge region 23, where modulation response of the directors 28 is very fast. For purposes of this invention, the edge region 23 illustrated in FIG. 3 (also called the surface effect region 23) is considered to be the region of the liquid crystal material 22 where an applied voltage of eight (8) volts or less does not induce liquid crystal director (i.e., molecular) reorientation of more than five (5) degrees. There is, of course, a similar edge or surface effect region 25 adjacent the upper alignment layer 26, but that surface effect region 25 is not used in this example of a fast polarization controller 10 embodiment to modulate the light beam 13, as will become more clear from the description below.

As mentioned above, for the planar waveguide to always guide light and not allow the light to escape, the index of refraction $n_1$ of the core 50 must always be higher than the index of refraction $n_2$ of the passive cladding 15, 17, or 19, and it must always be higher than the index of refraction $n_2(V)$ of the liquid crystal material 22, which then also functions as cladding for the core 50. The waveguide, therefore, comprises a combination of the core 50, the passive cladding 15, 17, 19, and the liquid crystal cells 20, 30, 40. The side cladding 16 is not needed for one-dimensional wave guiding, but it can be included as part of the waveguide, if two-dimensional wave guiding is desired.

As shown by the intensity profile 90 of light 13 propagating through the waveguide (FIG. 3), some of the light energy 92, 92' extends into the cladding, including the liquid crystal cell 20 on the top and the cladding layer 15 on the bottom, because there is not instant reflection of all light rays in the core 50 at the interfaces of the core 50 and cladding material 15, 17, 19, or 20. Instead, some light rays cross the interfaces from the core 50 into the cladding 15, 17, 19, or 20, where the lower index of refraction $n_2$ or $n_2(V)$ causes such light rays to diffract or bend and propagate back into the core 50. The portion 92, 92' of the light energy of the beam 13 that propagates in this manner in the cladding 15, 17, 19, 20 is known as the evanescent field. The precise amount of the light beam 13 that propagates in the cladding 15, 16, 19, 20, i.e., that comprises the evanescent field 92, 92', can be controlled for a particular wavelength of light by the design parameters and materials of the waveguide, such as the thickness of the core 50 and the differences in the indices of refraction of the core 50 and cladding 15, 16, 19, or 20, as is understood by persons skilled in the art. Typically, about 5% to 20% of the light beam propagates in the cladding 15, 17, 19, 20. Therefore, the portion 92 of this evanescent light energy that extends into the liquid crystal 22 is preferably confined to the fast-modulating, edge or surface effect region 23 of the liquid crystal material 22, as explained above, for fast polarization modulation and control of the beam 12.

The phase velocity of the guided beam 13 propagating through the waveguide in the region of a liquid crystal cell 20, 30, 40, as illustrated in the enlarged longitudinal cross-section of cell 20, in FIG. 3, is described by an effective index of refraction $n_{eff}(V)$ of the waveguide, which is a function of $n_1$, $n_2$, $n_2(V)$, $\lambda$ and a, where $\lambda$ is the wavelength of the light and a is the thickness of the waveguide core 50. In general, a liquid crystal material 22 should be chosen so that the extraordinary index of refraction $n_e$, which is the same as $n_2(V)$ in the example in FIG. 3, does not exceed the core index of refraction $n_1$ when maximum voltage $V_a$ is applied, so that the liquid crystal does not couple light out of the waveguide. Shutting off the applied voltage $V_a$ will cause the liquid crystal index $n_e$, i.e., $n_2(V)$, to drop toward the ordinary index of refraction $n_o$ at the boundary surface 24'. The alignment layer surface 24' in this application is buffed or otherwise prepared so that the directors 28 of the liquid crystal material 22 align in the direction of the light propagation vector 94, i.e., parallel to the longitudinal axis 95 of the waveguide core 50. Therefore, an increasing voltage $V_a$ has the effect of changing the effective index of refraction $n_{eff}(V)$ for the guided TM mode of light only and not for the TE mode. The change of the effective index of refraction $\Delta n_{eff}$ of the waveguide will depend on the change of index of refraction $\Delta n_2(V)$ of the liquid crystal material 22 and the penetration depth of the optical wave 92 into the liquid crystal material 22 in the surface effect region 23. In this regard, an estimate of the effective voltage dependent birefringence will be:

$$\Delta n_{eff} \approx \frac{\beta \Delta n_e^2}{n_e} \approx 10^{-3}, \tag{1}$$

where $\beta$ is a parameter that varies from 0 to 1 and depends on the mode number of the waveguide and penetration depth of the optical wave 92 into the liquid crystal material 22, i.e., the surface effect region 23. For a single mode fiber waveguide, $\beta$ is typically on the order of 0.5.

As mentioned above, each liquid crystal cell 20, 30, 40 needs to have at least one wave of stroke in order for this example polarization controller in FIGS. 1-3 to change any state of polarization of the input beam 13 to any other state of polarization in the output beam 14. Using an example telecommunications wavelength $\lambda$ of 1.5 μm, the required interaction length of the light beam with the liquid crystal cell 20, 30 or 40 to produce one wave of stroke, i.e., to retard the extraordinary ray enough to produce an optical path difference (OPD) equal to one wavelength, can be estimated by the relationship:

$$OPD = \frac{\Delta n_{eff} L}{\lambda}. \tag{2}$$

Setting OPD (optical path difference) to one wavelength results in an interaction length L≈1 mm, which is a very practical length for the liquid crystal cell 20. Therefore, since the fast polarization controller 10 of this invention uses the surface mode, i.e., only liquid crystal material 22 in the edge region 23, for polarization control of the light beam 13, the liquid crystal cell 20 can be made practically as long as necessary to get one wave of stroke or even many waves of stroke, if desired, and still have the benefit of the fast modulation or control provided by the surface effect molecules according to this invention. Such surface-mode operation of this fast polarization controller 10 can be in a preferable range of 10 khz to 100 khz, although operation outside that preferred range is also possible.

The $\Delta n_{eff}$ can be altered as required by the design of a particular waveguide, i.e., selecting a liquid crystal with an index of refraction $n_2(V)$ that remains in the range described above. However, there will be a tradeoff between the magnitude of $\Delta n_{eff}$ and temporal response. The closer $n_2(V)$ gets to $n_1$, the weaker the guiding. Therefore, a larger $\Delta n_{eff}$ may provide a faster response, but it may also weaken the wave guiding, and vice versa.

The $\lambda/2$ waveplates 60, 70 can be formed in any manner. One example of suitable ½-wave plates is a very thin polymer, which are well-known in the art, and they can be positioned in narrow saw kerfs 61, 71, respectively, extending into the top module 12 and bottom module 13 and orthogonally across the waveguide core 50 and cladding 15, 17, 19 (FIGS. 1 and 2). Such thin polymer ½-wave plates are preferred, because they keep light power losses to a minimum, although quartz and other materials can also be used. Various kinds of thin polymer ½-wave plates can be obtained, for example from Meadowlark Optics, of Frederick, Colo., Nippon Telegraph and Telephone Corporation, in Japan, or JDS Uniphase, of Ottawa, Canada. It is preferred that the saw kerfs 61, 71 be on the order of about 25 μm or less so that free expansion of the unguided light wave across the kerfs 61, 71 will not lead to excessive losses upon re-coupling to the waveguide core 50 on the other side of the kerfs 61, 71.

The liquid crystal material 22 can be any of a number of suitable varieties, including, but not limited to, nematic liquid crystals (NLC). Persons skilled in the art are familiar with the various varieties and characteristics of liquid crystals and are capable of selecting and implementing them for the purposes described herein, once they understand the principles of this invention.

As an example of an LC waveguide polarization controller that could be used in the present invention, one may use an inverted-ridge channel design on top of a p-doped silicon substrate that may serve as the lower electrode 21. An inverted ridge design has the advantage that the top surface is smooth and does not interfere with subsequent layers used to align the liquid crystal molecules 28.

It may be beneficial to keep the mean field diameter of the guided mode to be over 3 μm to improve coupling with optical fibers (not shown) and to enable the guided wave to traverse the narrow (20 μm) dicing saw cuts or kerfs 61, 71 through the guiding channels into which thin polymer waveplates 60, 70 are inserted to rotate the polarization vectors. In the following example design, a low index guide layer is chosen to give a low contrast waveguide with a large mode diameter.

For example, the silicon substrate could be covered with 4 μm of thermal oxide with an index approximately of 1.45 over which a 1 μm layer of silicon oxynitride $SiO_xN_y$ is applied using plasma enhanced chemical vapor deposition (PECVD). It is known to those skilled in the art that the ratio of x:y can be controlled to yield a film with an index between 1.45 and 2. In this example, the silicon oxynitride layer may be n=1.54. The silicon-oxynitride layer can then be patterned into a ridge 1 μm thick by 3 μm wide using reactive ion etching to leave smooth sidewalls. Over this layer one can apply $SiO_2$ (n=1.45) and planarize back to the top of the channel using chemical mechanical polishing methods resulting in a 1 μm×3 μm ridge of index n=1.54 surrounded by $SiO_2$ on either side with an index of 1.45. Over this structure one can then apply a second film of silicon oxynitride 3 μm thick with an index of 1.54. The structure can then be annealed at high temperature to remove excess hydrogen and nitrogen giving a low loss waveguide at 1.55 μm.

The waveguide surface can then be coated with a standard polyimide as used in the manufacture of common liquid crystal displays (LCD) and rubbed with a velvet cloth in the direction of the k-vector of the light. A top coverglass whose underside can be coated with a conduction layer such as indium tin oxide (ITO) can then be spaced several to 10 microns from the waveguide surface using precision glass spacers.

To ensure guiding at all voltage values it is beneficial to use a liquid crystal material whose extraordinary index is below 1.5. For example, the liquid crystal ZLI2359 from EM Industries, Inc., has ordinary and extraordinary indices of 1.467 and 1.519 at a wavelength of 589 nm.

The voltage dependence of the $TM_0$ mode can be estimated by noting that the guided mode is similar to an asymmetric slab mode. Though the actual values of the propagation constants are slightly smaller than those computed for a slab waveguide with a 4 μm core, the difference between the effective indices of the TM modes for the LC index at $n=n_o$ and $n=n_e$ is well approximated. It is well known to those skilled in the art to solve for and take the difference of the effective indices of a slab waveguide with a substrate index of 1.45, a 4 μm core with index of 1.54, and the top cladding index of 1.519 and 1.467, giving $\Delta n_{eff}$~0.0015 (See Equation 2.29 of *Fundamentals of Optical Waveguides* by Katsunari Okamoto, Academic Press, San Diego, (2000)). Typically, one realizes about half this value at a voltage of 50 $V_{rms}$. The electrode length required to give one wave of stroke at 1.55 μm is then $$L \approx \frac{1.55 \text{ μm}}{0.00075} = 2 \text{ mm.}$$

Between electrodes, as is known to those skilled in the art, the waveguide channel can be cut with a precision dicing saw to yield a trench approximately 20 μm wide. This waveguide is single mode with a mean-field diameter of approximately 4 μm in the out-of-plane dimension, which is sufficiently large to cross the trench with minimal losses. Into this channel a 15 μm optical half waveplate formed from high-birefringence polymers may be placed and fixed with index matching glue.

Figure 6:
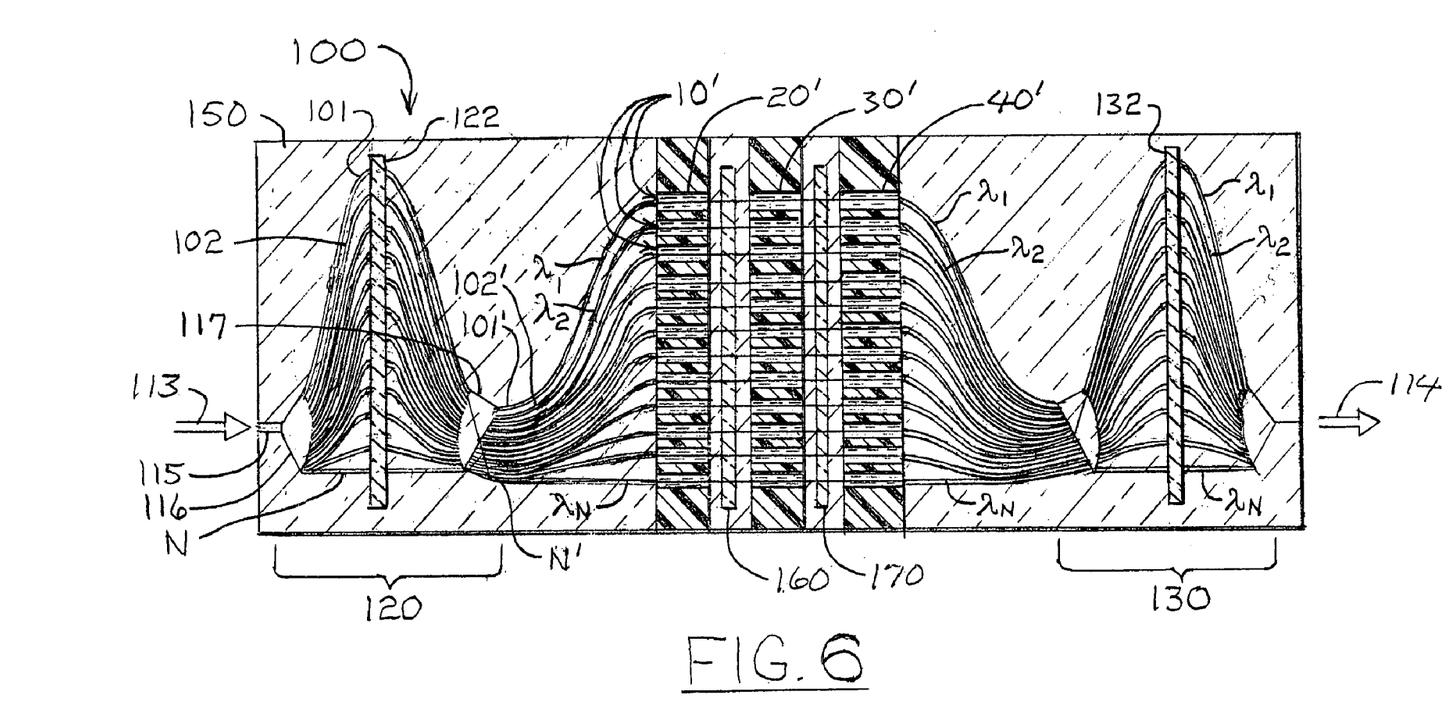
FIG. 6 is a diagrammatic cross-sectional view of an example multi-channel polarization controller that utilizes the principles of this invention.

The fast polarization controller 10 described above is for a single channel, i.e., a single wavelength of light. A multi-channel, fast polarization controller 100 for controlling polarization of a plurality of wavelengths in a light beam 113 is illustrated in FIG. 6. Essentially, a plurality of single polarization controllers 10', each of which includes three liquid crystal cells 20', 30', 40' as described above, are combined together in an array on a single waveguide substrate 150 and/or superstrate (not shown in FIG. 6, but similar to the top module 12 described above except for having multiple channels). Two thin λ/2 waveplates 160, 170 provide the function of rotating the eigenstates of polarization between all the respective first and second liquid crystal cells 20', 30' and between all the respective second and third liquid crystal cells 30', 40', as described above for the single channel embodiment 10, but this function is for all the multiple channels in this multi-channel embodiment 100.

As mentioned above, the incoming light beam 113 coupled to the fast, multi-channel, polarization controller 100 can comprise many individual wavelengths $\lambda_1, \lambda_2, \ldots, \lambda_N$. For example, some telecommunications applications have multi-channel light beams comprising 40 to 100 independent wavelength channels separated by 50 GHZ to 100 GHZ centered around 1550 nm. In some applications, it is necessary to control the polarization of each channel or wavelength independently. For example, in certain situations, where the polarization states of multiple channels or wavelengths are uncorrelated, there is a need to convert all of them to a uniform polarization state. One such application is dispersion mode compensation. While the multi-channel, fast polarization controller 100 of this invention can accommodate these and other needs for such large numbers of channels or wavelengths $\lambda_1, \lambda_2, \ldots, \lambda_N$, it is impractical to illustrate such a large number of channels in the drawings accompanying this description. Therefore, the illustrated multi-channel, fast polarization controller embodiment 100 illustrated in FIG. 6 with only twelve channels, which is sufficient to describe the principles of the invention without unnecessary clutter. Once these principles are understood, persons skilled in the art can implement them with any desired numbers of channels or wavelengths $\lambda_1, \lambda_2, \ldots, \lambda_N$.

In the multi-channel, fast polarization controller 100 illustrated in FIG. 6, the incoming light beam 113 is coupled to, enters, and passes through an arrayed waveguide grating (AWG) 120, which separates each individual channel or wavelength $\lambda_1, \lambda_2, \ldots, \lambda_N$ and routes the light of each channel into a separate waveguide 101, 102, ..., N. Such AWG's are well-known in the art and are described in detail, for example, in the article by J. Lam and L. Zhao, "Design Trade-offs For Arrayed Waveguide Grating DWDM (Dense Wave Division Multiplexing) MUX/DEMUX", published on the website of Lightwave Microsystems, Inc. (now Neophotonics, Inc.), which is incorporated herein by reference. Essentially, the input waveguide 115 delivers the input beam 113 to a lens region 116, which divides the light energy by wavelength $\lambda_1, \lambda_2, \ldots, \lambda_N$ among the different individual channel waveguides 101, 102, ..., N. Each grating channel waveguide 101, 102, ..., N has a precise length difference with its neighbors so that the light in each channel waveguide emerges with a different phase delay at the output, where a second lens region 117 re-focuses the light from all the individual channel waveguides 101, 102, ..., N onto the output waveguides 101', 102', ..., N' in the output array. Due to the precise differential phase tilt for different wavelengths, each wavelength $\lambda_1, \lambda_2, \ldots, \lambda_N$ is focused into a different output channel waveguide 101', 102', ..., N' in the output array.

However, because of the path lengths phase shifts, curvatures, and other characteristics of the channel waveguides 101, 102, ..., N that occur or are encountered in the channel waveguides 101, 102, ..., N, some polarization changes can occur. Therefore, a ½-wave plate 122 is positioned at the symmetry plane of the AWG 120 with its fast axis at 45 degrees with respect to the fast axes of the liquid crystal cells 20', 30', 40', which, as in the single channel polarization controller 10 described above, are in a plane parallel to the waveguide surface, thus perpendicular to the TM mode. This λ/2 waveplate renders the AWG 120 polarization insensitive by rotating the plane of polarization of the light in each of the channel waveguides 101, 102, ..., N by 90 degrees. Essentially, polarization changes that occur in the first half of the AWG 20 approaching the symmetry plane, where the ½-wave plate 122 is positioned, will be undone as the light propagates through the second half of the AWG 20.

The channel waveguides 101', 102' ..., N' then guide the respective individual wavelengths $\lambda_1, \lambda_2, \ldots, \lambda_N$ of light to the respective fast polarization controller components 10', which, with the three liquid crystal cells 20', 30', 40' and two ½-wave plates 160, 170, have the capability of changing any incoming polarization state to any other polarization state, as described above. Then, with the individual light channels $\lambda_1, \lambda_2, \ldots, \lambda_N$ adjusted by the fast polarization controller components 10' to whatever polarization state is desired, the output light is processed-out and recombined into a common output beam 114 in the output waveguide 119 by the output arrayed waveguide grating (AWG) 130, which is essentially the reverse of the AWG 120 described above. Again, a ½-wave plate 132 is positioned in the symmetry plane of the AWG 130 to render the output AWG 130 polarization insensitive, as explained above for the input AWG 120.

The above-described function of separating and routing the various wavelengths $\lambda_1, \lambda_2, \ldots, \lambda_N$ into the various channel waveguides 101, 102, ..., N can also be performed by other techniques, for example, other diffraction grating structures, prisms, etc., as will be understood by persons skilled in the art. Likewise, the recombination of the various wavelengths $\lambda_1, \lambda_2, \ldots, \lambda_N$ from the various channel waveguides 101', 102', ..., N' into the common output beam 114 can be accomplished with other diffraction grating structures, prisms, etc., as will be understood by persons skilled in the art.

The foregoing description is considered as illustrative of the principles of the invention. Furthermore, since numerous modifications and changes will readily occur to those skilled in the art, it is not desired to limit the invention to the exact construction and process shown and described above. Accordingly, resort may be made to all suitable modifications and equivalents that fall within the scope of the invention. The words "comprise," "comprises," "comprising," "include," "including," and "includes" when used in this specification are intended to specify the presence of stated features, integers, components, or steps, but they do not preclude the presence or addition of one or more other features, integers, components, steps, or groups thereof.

The embodiments of the invention in which an exclusive property or privilege is claimed are defined as follows:

1. Polarization controller apparatus, comprising:
   a waveguide that is clad at least partially with at least a first liquid crystal cell and a second liquid crystal cell for guiding a light beam in a propagation vector through the waveguide, each of said cells being responsive to an applied voltage to have variable birefringence with a slow axis oriented parallel to the propagation vector and a fast axis oriented perpendicular to the slow axis; and
   first means positioned between the first liquid crystal cell and the second liquid crystal cell for rotating eigenstates of polarization of the light beam.

2. The polarization controller apparatus of claim 1, wherein said first means for rotating eigenstates of polarization includes a first ½-wave birefringent retarder positioned across the waveguide between the first liquid crystal cell and the second liquid crystal cell with its fast axis rotated more than zero degrees in relation to the fast axis of the first liquid crystal cell.

3. The polarization controller apparatus of claim 2, wherein said first ½-wave birefringent retarder is positioned with its fast axis rotated 45 degrees in relation to the fast axis of the first liquid crystal cell.

4. The polarization controller apparatus of claim 3, wherein said first ½-wave birefringent retarder comprises a thin polymer birefringent ½-wave plate.

5. The polarization controller apparatus of claim 1, wherein said means for rotating eigenstates of polarization includes a polarization maintaining optical fiber twisted to deliver the light beam to the second liquid crystal cell with said eigenstates of polarization rotated in relation to said eigenstates of polarization of the light beam as it emerges from the first liquid crystal cell.

6. The polarization controller apparatus of claim 1, wherein said means for rotating eigenstates of polarization includes a rotated waveguide core.

7. The polarization controller apparatus of claim 1, wherein said variable birefringence has sufficient retarding capability to produce at least one wave of stroke.

8. The polarization controller of claim 1, wherein the waveguide is also partially clad with a third liquid crystal cell that is also responsive to an applied voltage to have a variable birefringence with a slow axis oriented parallel to the propagation vector and a fast axis oriented perpendicular to the slow axis; and
   second means positioned between the second liquid crystal cell and the third liquid crystal cell for rotating eigenstates of polarization of the light beam.

9. The polarization controller apparatus of claim 8, wherein said second means for rotating eigenstates of polarization includes a second ½-wave birefringent retarder positioned across the waveguide between the second liquid crystal cell and the third liquid crystal cell with its fast axis rotated more than zero degrees in relation to the fast axis of the second liquid crystal cell.

10. The polarization controller apparatus of claim 9, wherein said second ½-wave birefringent retarder is positioned with its fast axis rotated 45 degrees in relation to the fast axis of the second liquid crystal cell.

11. The polarization controller apparatus of claim 10, wherein said second ½-wave birefringent retarder comprises a thin polymer birefringent ½-wave plate.

12. The polarization controller apparatus of claim 8, wherein said second means for rotating eigenstates of polarization includes a polarization maintaining optical fiber.

13. The polarization controller apparatus of claim 8, wherein said second means for rotating eigenstates of polarization includes a rotated waveguide core.

14. The polarization controller apparatus of claim 8, wherein said variable birefringence has sufficient retarding capability to produce at least one wave of stroke.

15. The polarization controller of claim 1, wherein each of the liquid crystal cells has an alignment surface that orients liquid crystal directors parallel to the propagation vector of the guided light beam.

16. The polarization controller of claim 15, including means for controllably applying and varying respective voltages applied across each of the liquid crystal cells to vary birefringence of the liquid crystal cells.

17. The polarization controller of claim 1, wherein the core and the liquid crystal cell have respective indices of refraction that guide the light beam with an evanescent field that extends into the liquid crystal cell.

18. The polarization controller of claim 17, wherein each liquid crystal cell has a surface effect region adjacent the core.

19. The polarization controller of claim 18, wherein the core thickness and the respective indices of refraction of the core and liquid crystal cells are set to extend the evanescent field only into the surface effect region of the liquid crystal cell.

20. The polarization controller of claim 1, wherein the core is set in a substrate and the liquid crystal cells are contained in cavities of a cover positioned adjacent the core.

21. The polarization controller of claim 1, including:
multiple cores on a substrate; and
a plurality polarization controller subsets, each of which subsets comprises: (i) at least two liquid crystal cells that have variable birefringence; and (ii) a ½-wave plate between such two liquid crystal cells and oriented with its fast axis rotated 22½ degrees in relation to the fast axis of the liquid crystal cells; and
wherein at least one of the subsets is positioned with its liquid crystal cells as cladding on at least one of the cores.

22. The polarization controller of claim 21, including at least one input waveguide that branches into the multiple cores.

23. The polarization controller of claim 22, including means for separating the light beam into multiple light beam portions, each portion having a distinct wavelength range, and for propagating each portion with a distinct wavelength range into respective distinct ones of the multiple cores.

24. The polarization controller of claim 23, wherein said means for separating the light beam and for propagating the portions with distinct wavelength ranges into the multiple cores includes a first arrayed waveguide grating positioned where said input waveguide branches into the multiple cores.

25. The polarization controller of claim 23, wherein said means for separating the light beam and for propagating the portions with distinct wavelength ranges into the multiple cores includes at least one diffraction grating.

26. The polarization controller of claim 23, wherein said means for separating the light beam and for propagating the portions with distinct wavelength ranges into multiple cores includes at least one prism.

27. The polarization controller of claim 23, wherein the first arrayed waveguide grating has a plurality of individual sub-waveguides that diverge from a first lens region in a symmetric pattern of respective different sub-waveguide lengths to converge at a second lens region and also has a ½-wave plate positioned at the symmetry plane half way through the arrayed waveguide grating with its fast axis rotated 45 degrees with respect to the TM mode of the light propagating through the sub-waveguides.

28. The polarization controller of claim 23, wherein birefringence of each of the liquid crystal cells is individually controllable by application of individually controllable voltages across each of the liquid crystal cells.

29. The polarization controller of claim 23, wherein the plurality of cores extend beyond the respective polarization controller subsets and merge together in an output waveguide.

30. The polarization controller of claim 29, including means for mixing the light beam portions from the individual cores and propagating the mixed light into the output waveguide.

31. The polarization controller of claim 30, wherein said means for mixing light beam portions and propagating the mixed light into the output waveguide includes a second arrayed waveguide grating positioned where the multiple cores merge into the output waveguide.

32. The polarization controller of claim 21, wherein each of the polarization controller subsets includes three liquid crystal cells with a first ½-wave plate positioned between the first and second liquid crystal cells and a second ½-wave plate positioned between the second and third liquid crystal cells with the respective fast axes of the first and second ½-wave plates rotated 22½ degrees with respect to the fast axes of the liquid crystal cells.

33. Polarization controller apparatus, comprising:
a waveguide, which is clad at least partially by a plurality of liquid crystal cells so that an evanescent field of a light beam propagated in the waveguide extends into the liquid crystal cells;
a birefringent ½-wave retarder positioned between adjacent ones of the liquid crystal cells and extending across the waveguide for rotating eigenstates of polarization of the light beam between the liquid crystal cells; and
means for applying variable voltages across the liquid crystal cells for varying birefringence of the liquid crystal cells.

34. A method of controlling polarization of a light beam, comprising:
propagating the light beam in a waveguide that is at least partially clad with at least a first liquid crystal cell and a second liquid crystal cell in such a manner that the light beam's evanescent field extends into the first and second liquid crystal cells;

actuating the first liquid crystal cell to retard TM mode of the light in the evanescent field;
rotating eigenstates of polarization of the light beam that emerges from the first liquid crystal cell; and
actuating the second liquid crystal cell to retard TM mode of the light in the evanescent field.

35. The method of claim 34, including:
rotating eigenstates of polarization of the light beam that emerges from the second liquid crystal cell;
propagating the light beam through another portion of the waveguide that is clad with a third liquid crystal cell such that the evanescent field of the light beam extends into the third liquid crystal cell; and
actuating the third liquid crystal cell to retard TM mode of the light in the evanescent field.

36. The method of claim 34, including extending the evanescent field only into a surface effect region of the respective liquid crystal cells.

37. The method of claim 34, including orienting directors in the liquid crystal cells to be substantially parallel to a propagation vector defined by the light beam propagating through the waveguide.

38. The method of claim 37, including activating the directors to rotate in a plane that is parallel to the TM mode.

39. The method of claim 34, including:
separating the light beam by wavelengths into a plurality of individual waveguide cores, each of which is clad at least partially by a polarization controller subset that comprises at least two liquid crystal cells and a ½-wave plate positioned between the liquid crystal cells; and
actuating the liquid crystal cells to control polarization of the respective wavelengths of light in the respective individual cores.

40. The method of claim 39, including merging the respective wavelengths of light in the individual cores into a recombined light beam in a common output waveguide.

41. A method of controlling polarization of a light beam, comprising:
propagating the light beam through a waveguide that is clad at least partially by at least two liquid crystal cells in such a manner that an evanescent field of the light beam extends only into surface effect regions of the liquid crystal cells;
rotating eigenstates of polarization between the liquid crystal cells; and
applying voltages across the liquid crystal cells to vary birefringence of the liquid crystal cells as needed to produce a desired polarization in the light beam.

* * * * *